Patented Jan. 5, 1943

2,307,421

UNITED STATES PATENT OFFICE 2,307,421

SILVER CATALYST AND METHOD OF MAKING THE SAME

Johan Overhoff, Amsterdam, Netherlands; vested in the Alien Property Custodian

No Drawing. Application May 25, 1940, Serial No. 337,199. In the Netherlands June 28, 1939

18 Claims. (Cl. 252—224)

This invention is directed to a new and useful catalyst material comprising silver metal and to a method of its preparation, and more particularly to a silver catalyst in pelleted form of porous structure and relatively low density obtained by shaping a mixture of finely divided silver and a reducible silver compound into pellets of the desired size and shape and subjecting the pellets to reducing conditions to convert all or a part of the reducible silver compound to silver metal.

Catalytic materials comprising silver have found wide application in processes of many varied types. They are used, for example, to catalyze many reactions encountered in the field of hydrocarbon chemistry such as, among many others, the hydrogenation, cracking, destructive hydrogenation, dehydrogenation and oxidation of hydrocarbons, the production of ketones and aldehydes from primary and secondary alcohols, respectively, and the production of the olefine oxides by catalytic oxidation of the corresponding olefines.

The known silver catalysts in leaf, pellet, mesh, sponge, granular and other form have the disadvantage of losing a substantial part of their already small active surface area due to the rather high compression of the material required to make them capable of withstanding the high pressures and mechanical abuse encountered in commercial operations.

To attain the extensive available surface area upon which the efficiency of a catalytic material is largely dependent, recourse has been had to finely divided silver. To permit the use of silver in this form particularly active in commercial operations, it has been considered necessary that the finely divided silver be deposited upon suitable inert supporting materials, such as pumice, alumina, charcoal, etc. This has the disadvantage of making difficult uniform distribution of the catalyst throughout the reaction zone and sacrifices a substantial part of the reaction zone to the inert support.

It is an object of the invention to provide a novel and useful catalytic material of great activity and strength which consists substantially entirely of silver metal and the use of which obviates the above-described and other disadvantages inherent in the use of the known silver catalysts. It is a further object of the invention to provide a catalyst consisting substantially of silver, in pellet form, possessing extensive available active surface area and particularly adapted to withstand pressures and mechanical abuse encountered in commercial operation without loss of available active surface area. Another object of the invention is to provide a method for the preparation of an active porous silver catalytic material in pellet form.

In accordance with the process of the invention, finely divided silver, obtained by any suitable means, is mixed in proper proportions with an oxygen-containing compound of silver capable of being reduced to metallic silver such as, for example, the oxide or carbonate of silver. Although I have chosen as my preferred examples of suitable reducible silver compounds the oxide and carbonate of silver, it is to be understood that the invention is in no wise limited to these compounds and that the silver compound mixed with the finely divided silver may suitably consist of any silver compound capable of reduction to metallic silver in the presence of metallic silver without deleteriously affecting the physical or chemical characteristics of the metallic silver present to any substantial extent. The ratio of oxygen-containing compound of silver to finely divided silver may vary within wide limits and is governed to a substantial degree by the porosity and mechanical strength desired in the final catalytic material. Thus, in carrying out the invention with silver oxide as the oxygen-containing silver compound, I may use from 1.5 to 3 parts by weight of silver oxide to about one part by weight of finely divided silver.

The resulting mixture of finely divided silver and oxygen containing compound of silver may be compressed into pelleted form by any suitable device or means. By the terms "pelleted form" or "pellet" as used throughout this specification and claims, it is intended to include any desirable shape of reasonably small size, comprising pills, pellets, pastilles, tablets and the like. The resulting pellet consisting of an intimate mixture of silver and oxygen-containing compound of silver is subjected to any desirable treatment capable of effecting the reduction of the oxygen-containing compound of silver to metallic silver without disintegrating the pellet. The reduction may be carried out by heating the pellets for a sufficient length of time, to elevated temperature, for example in excess of 200° C., but not exceeding a temperature at which disintegration of the pellet form will occur. The heating may be carried out in a reducing atmosphere such as, for example, hydrogen or a hydrogen-containing gas.

The reduction of the oxygen-containing compound of silver in the pellet may be controlled so as to effect the substantially complete reduction of the oxygen-containing silver compound in the pellet to yield a substantially completely porous silver pellet. The reduction may however be controlled in such wise as to effect the reduction of only the oxygen-containing compound of silver substantially near the surface of the pellet to produce a final pellet comprising a solid core consisting of an intimate mixture of silver and the oxygen-containing compound of silver surrounded by a porous outer coating of substantially pure silver having an extensive available active catalytic surface.

As pointed out the finely divided silver used as one of the starting materials may be obtained by any suitable method. It may advantageously be prepared by the thermal decomposition of a suitable organic compound of silver which upon heating will decompose with the formation of an active and finely divided silver. Particularly suited organic silver compounds are the silver salts of aliphatic carboxylic acids such as formic, acetic, propionic, butyric, isobutyric, valeric, oxalic, malic, malonic, lactic, maleic and the like, which may be readily decomposed by heating them to a decomposition temperature. The initial finely divided silver may also be obtained by the reduction of organic silver compounds, as for example, the silver salts of the aliphatic carboxylic acids, in a reducing atmosphere at elevated temperatures.

In a preferred method of carrying out the process of the invention, one part by weight of silver oxalate is mixed with two parts by weight of silver oxide. The resulting mixture is raised to a decomposition temperature of about 230° C. at which the silver oxalate is decomposed leaving a finely divided active metallic silver. The admixture of silver oxide with the silver oxalate has the advantage of tempering the violence of the silver oxalate decomposition, thus permitting the handling of greater amounts of the silver oxalate than would be possible in the absence of the silver oxide. The resulting mixture of finely divided silver and silver oxide is compressed into pellets and subjected to elevated temperatures for a period of time sufficiently long to reduce all or a part of the silver oxide in the pellet to metallic silver.

The resulting final catalyst is a light silver pellet having a fine porous structure. A catalyst prepared from one part of silver oxalate and two parts of silver oxide yields a porous silver mass having about twice the specific volume of massive silver. In spite of its fine porous structure the final catalyst possesses the mechanical strength desired of a commercial catalyst.

If desired materials capable of promoting the catalytic activity of the silver catalyst may be incorporated into the mixture of finely divided silver and silver compound capable of reduction under the specified conditions, prior to compression of the mixture into the desired pelleted form. Suitable promoters which may be incorporated singly or in combination into the catalyst as prepared in accordance with the invention include the metals such as copper, gold, iron, manganese, nickel, cobalt, cerium, thorium, zinc, etc. The nature of the promoting material added will be governed by the type of reaction the final catalytic material is intended to catalyze, and the invention is not limited to the use of any specific element or combination of elements or compounds added as promoting materials.

I have found the presence of relatively small amounts of oxygen-containing sodium and/or lithium compounds in the silver catalysts of the invention greatly improves their activity particularly when they are used to catalyze the oxidation of olefines to the corresponding olefine oxides. Thus, I have found that oxygen-containing sodium and lithium compounds as, for example, NaOH, LiOH, $Na_2CO_3$, $Li_2CO_3$, $NaNO_3$, $LiNO_3$, sodium oxalate, lithium oxalate and the like, present in the silver catalyst as prepared in accordance with the invention, in small quantities, for example, about one-half to about 5% by weight of the catalyst mass, provides a catalyst particularly effective in the oxidation of ethylene to ethylene oxide at temperatures ranging, for example, between about 200° to 300° C. and preferably between 230° C. and 270° C. When carrying out the oxydation of ethylene in the presence of this promoted catalyst, it was found that the ethylene oxide formed constituted the greater part of the ethylene oxidation reaction products.

*Example I*

A solution of sodium oxalate and sodium hydroxide was added to a solution of silver nitrate in such controlled proportions that the resulting dried precipitate, consisted of a mixture of one part by weight of silver oxalate to two parts by weight of silver oxide. A part of the mixture was raised to a temperature of 230° C. at which temperature the silver oxalate suddenly decomposed, resulting in a mixture of finely divided silver and silver oxide. The resulting mixture was compressed into pellets of 2.5 mm. thickness and 5 mm. diameter weighing about 250 mg. The pellets were heated to a temperature of 220° C. for about one hour to effect the reduction of the silver oxide in the pellets to metallic silver.

Ethylene diluted with air in the proportion of 16.7% by volume of ethylene to 83.3% by volume of air was passed over the catalyst so prepared at a temperature of 240° C. at the rate of 1 liter of the gaseous mixture per two grams of catalyst per hour. Analysis of the reaction products gave the following results:

| | Per cent by volume |
|---|---|
| Ethylene oxide | 3.2 |
| Carbon dioxide | 1.9 |
| Ethylene | 11.6 |
| Oxygen | 10.8 |
| Nitrogen | 72.5 |

19.6% by weight of the ethylene was converted to ethylene oxide and 5.8% by weight was oxidized to carbon dioxide and water.

*Example II*

2.0 grams of silver oxide, 1 gram of silver oxalate and 60 mg. of $Na_2CO_3$ were intimately mixed. The mixture was heated to a temperature of 230° C. resulting in the decomposition of the silver oxalate yielding a finely divided silver. The mixture so obtained comprising silver oxide, finely divided silver and sodium carbonate was shaped into pellets. The silver oxide contained in the pellets was reduced to silver as in Example I.

Ethylene diluted with air in the proportion of 15.9% by volume of ethylene to 84.1% by volume of air was passed over the catalyst so prepared at a temperature of 260° C., at the rate of one liter of the diluted ethylene per two grams of catalyst per hour. Analysis of the reaction products gave the following result:

| | Per cent by volume |
|---|---|
| Ethylene oxide | 4.9 |
| Carbon dioxide | 4.1 |
| Ethylene | 9.2 |
| Oxygen | 8.0 |
| Nitrogen | 73.8 |

28.8% by weight of the ethylene was converted into ethylene oxide and 12.1% by weight was oxidized to carbon dioxide and water.

Modifications of the invention as set forth in the illustrative examples may be made without departing from the spirit thereof and it is to be understood that the invention is to be accorded a scope consistent with the scope of the appended claims.

I claim as my invention:

1. A porous silver metal-containing catalyst mass in pelleted form which is prepared by heating a mixture of silver oxalate and silver oxide to an elevated temperature to effect the decomposition of silver oxalate to yield a finely divided active silver, shaping the resulting mixture of finely divided silver and silver oxide into pelleted forms, and subjecting said pelleted forms to a temperature of from 200° C. to 250° C. for a sufficient length of time to reduce substantially all of the silver oxide to silver metal.

2. A silver catalyst in the form of porous pellets comprising silver metal which is obtained by heating a mixture comprising a silver salt of an aliphatic carboxylic acid and an oxygen-containing compound of silver selected from the group of silver oxide and silver carbonate to effect the decomposition of said silver salt to finely divided silver metal, compressing the resulting mixture of finely divided silver and oxygen-containing compound of silver into pellets, and heating the pellets at an elevated temperature for a sufficient length of time to convert at least a part of the oxygen compound of silver to silver metal.

3. A silver catalyst in the form of pellets of porous structure comprising silver metal which catalyst is obtained by forming a mixture of finely divided silver and a reducible oxygen-containing compound of silver into pellets, and subjecting the pellets to reducing conditions to convert at least a part of the reducible silver compound to metallic silver.

4. An active catalytic mass comprising silver in the form of pellets of porous structure which catalyst is obtained by forming a mixture of finely divided silver and silver oxide into pellets and subjecting the pellets to reducing conditions to effect substantial conversion of the silver oxide to silver metal.

5. An active silver catalyst of pelleted form and porous structure obtained by shaping a mixture comprising finely divided silver and a silver compound capable of reduction to silver into pelleted form and subjecting said pellets to reducing conditions to convert a substantial part of the reducible silver compound to metallic silver.

6. An active silver catalyst of pelleted form and porous structure which is obtained by shaping a mixture comprising finely divided silver metal, a silver compound reducible to silver metal, and a promoting amount of a compound of the group consisting of the oxygen-containing compounds of lithium and sodium into the form of pellets, and subjecting said pellets to reducing conditions to convert a substantial part of the reducible silver compound to silver metal.

7. An active silver catalyst of pelleted form and porous structure which is obtained by shaping a mixture consisting of finely divided silver metal, a silver compound which is reducible to silver metal, and from 0.5% to 5% by weight of the total mixture of an oxygen-containing compound of sodium into the form of pellets, and subjecting said pellets to the reducing conditions to convert a substantial part of the reducible silver compound to silver metal.

8. The method of preparing a porous, activated silver metal-containing catalytic material which comprises adding a small amount of a promoter selected from the group consisting of the oxygen-containing compounds of lithium and sodium to a mixture of a silver salt of an aliphatic carboxylic acid and silver oxide, heating the resulting mixture to effect the thermal decomposition of the silver salt to finely divided silver, shaping the thus heated mixture into pellets, and subjecting the pellets to reducing conditions to effect the substantial reduction of the silver oxide to silver metal.

9. The method of preparing an activated porous silver catalyst comprising adding a small amount of a promoter selected from the group consisting of the oxygen-containing compounds of lithium and sodium to a mixture of finely divided silver and a reducible oxygen-containing compound of silver, shaping the resulting mixture into pellets, and subjecting the pellets to reducing conditions to convert at least a part of the reducible oxygen-containing silver compound to silver metal.

10. The method of preparing a porous silver metal-containing catalytic mass which comprises mixing silver oxalate with silver oxide, heating the resulting mixture to a temperature sufficiently high to effect the decomposition of the silver oxalate to finely divided silver, shaping the resulting mixture of finely divided silver and silver oxide into pellets, and heating said pellets at an elevated temperature for a sufficient length of time to reduce substantially all of the silver oxide to metallic silver.

11. The method of preparing a porous silver metal-containing catalytic material in pelleted form which comprises mixing a silver salt of an aliphatic carboxylic acid with an oxygen-containing compound of silver selected from the group of silver oxide and silver carbonate, heating the resulting mixture to a temperature at which the silver salt is decomposed to finely divided silver, forming the resulting mixture of finely divided silver and oxygen-containing compound of silver into pellets, and heating said pellets to an elevated temperature for a sufficient length of time to reduce at least a part of the oxygen-containing compound of silver to metallic silver.

12. The method of preparing a silver catalyst which comprises mixing finely divided silver and a reducible oxygen-containing compound of silver, shaping said mixture into pellets by compression, and heating said pellets to a temperature of at least 200° C. for a time sufficiently long to reduce substantially all of the oxygen-containing compound of silver to silver.

13. The method of preparing a silver catalyst according to claim 12 wherein said oxygen-containing compound of silver is reduced to silver by heating the pellets in the presence of free hydrogen.

14. The method of preparing a silver catalyst which comprises mixing finely divided silver with silver carbonate, compressing the resulting mixture into pellets and subjecting the pellets to reducing conditions to convert at least a part of the silver carbonate to silver metal.

15. The method of producing an active silver catalyst in the form of strong, porous pellets of relatively low density which comprises mixing about one part by weight of finely divided silver with from about 1.5 to 3 parts by weight silver oxide, compressing the resulting mixture into pellets and subjecting the pellets to reducing conditions to effect reduction of substantially all of the silver oxide to silver metal.

16. The method of producing an active silver catalyst in the form of strong porous pellets of relatively low density comprising mixing a finely divided silver with silver oxide, compressing the resulting mixture into pellets, and subjecting the pellets to reducing conditions to effect substantial conversion of the silver oxide to silver metal.

17. The method of producing porous, silver metal-containing catalysts which comprises mixing finely divided silver with a reducible oxygen-containing silver compound, forming the resulting mixture into pellets and subjecting the pellets to reducing conditions to effect substantial conversion of the reducible oxygen-containing silver compound to metallic silver.

18. The method of producing a porous silver metal-containing catalytic material which comprises mixing finely divided silver with a reducible silver compound, forming the resulting mixture into pellets and subjecting the pellets to reducing conditions to effect substantial conversion of the reducible silver compound to metallic silver.

JOHAN OVERHOFF.